March 22, 1960 R. R. TURNER 2,929,499
MANDREL MANIPULATION APPARATUS
Filed Nov. 1, 1956 3 Sheets-Sheet 1
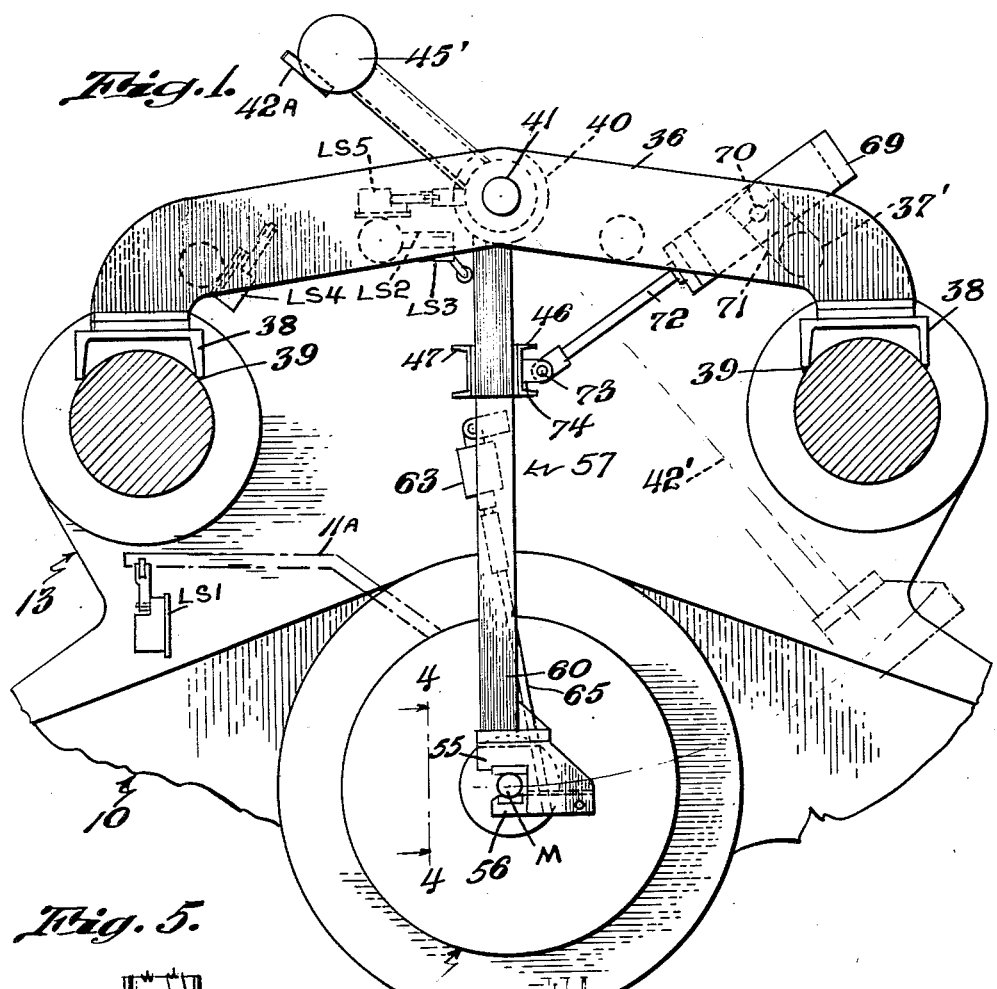
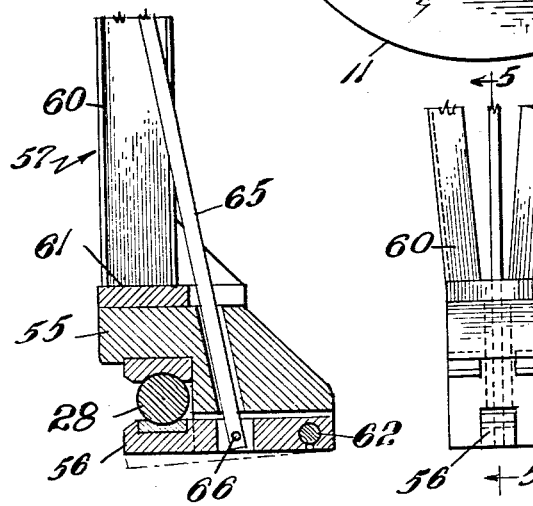
INVENTOR.
Ralph R. Turner
BY
Barlow & Barlow
ATTORNEYS.

March 22, 1960  R. R. TURNER  2,929,499
MANDREL MANIPULATION APPARATUS
Filed Nov. 1, 1956  3 Sheets-Sheet 2
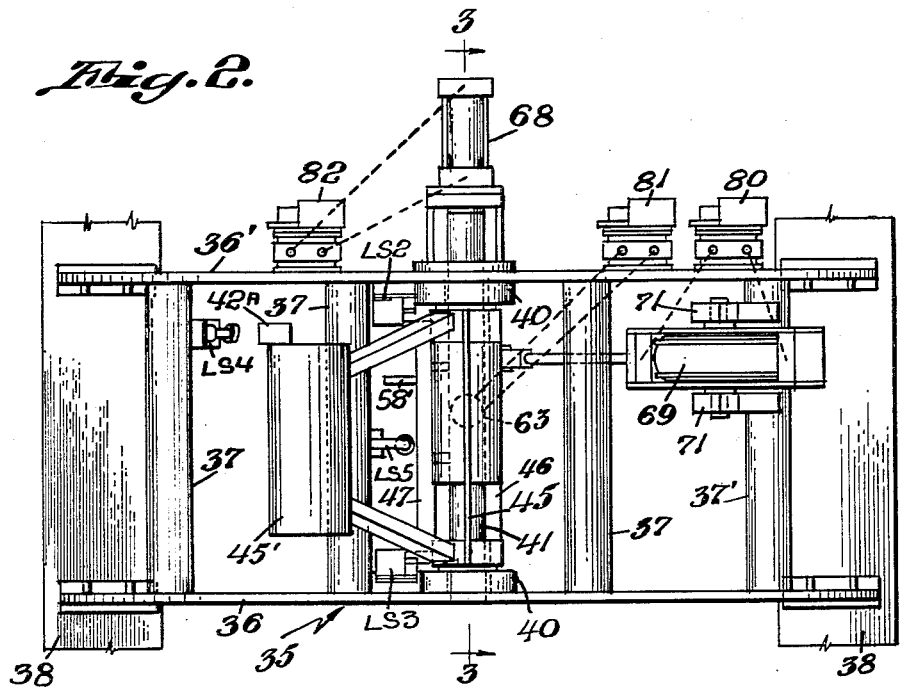
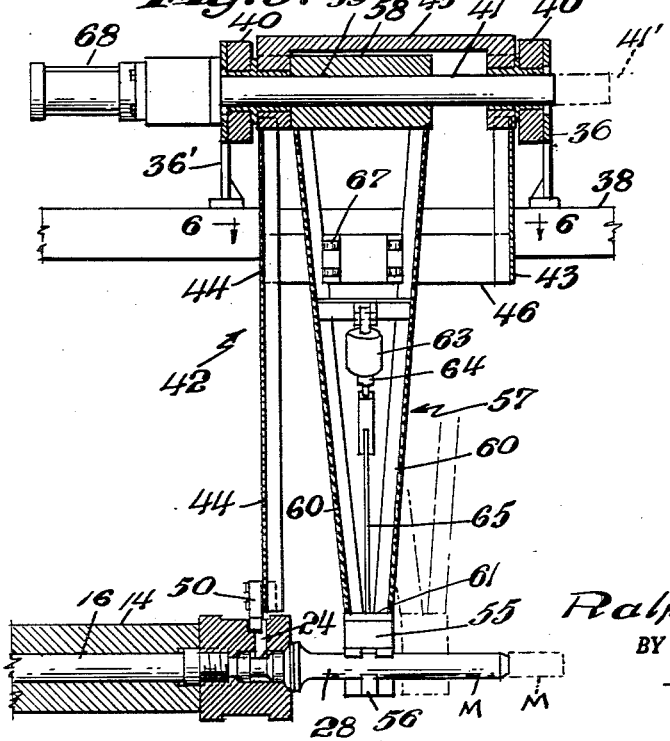
INVENTOR.
Ralph R. Turner
BY
Barlow & Barlow
ATTORNEYS.

March 22, 1960 R. R. TURNER 2,929,499
MANDREL MANIPULATION APPARATUS
Filed Nov. 1, 1956 3 Sheets-Sheet 3
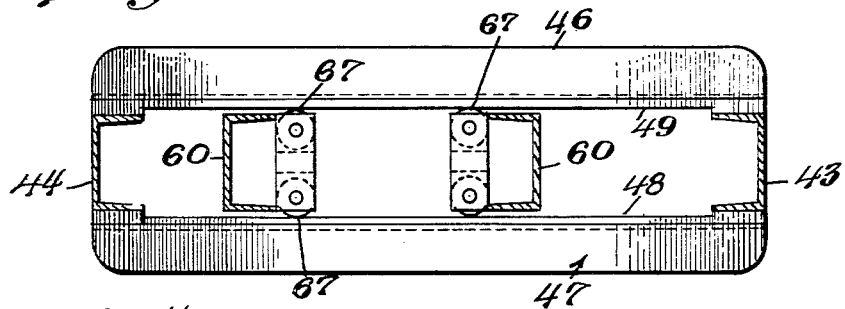
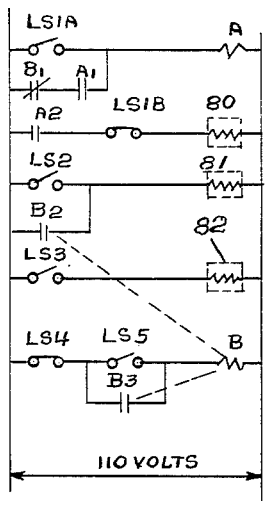
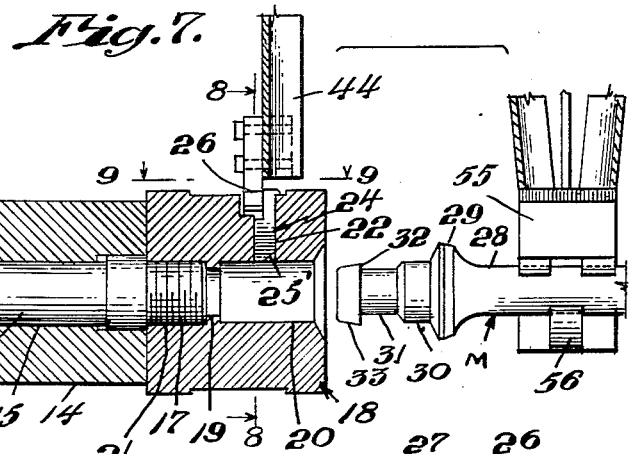
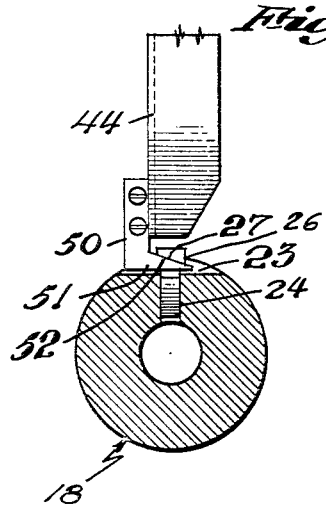
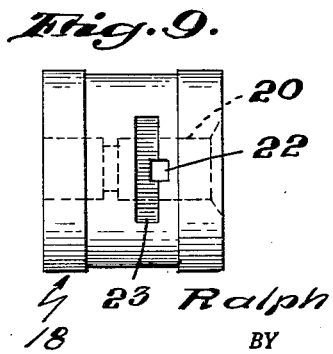
INVENTOR.
Ralph R. Turner
BY
Barlow & Barlow
ATTORNEYS.

United States Patent Office 2,929,499
Patented Mar. 22, 1960

2,929,499

MANDREL MANIPULATION APPARATUS

Ralph R. Turner, Warwick, R.I., assignor to United Wire & Supply Corporation, a corporation of Rhode Island Application November 1, 1956, Serial No. 619,853

10 Claims. (Cl. 207—1)

The invention relates to a mandrel manipulator for use in a metal extrusion machine or press.

The machine in which the mandrel is to be used is for extruding aluminum tubing by forcing the metal in a heated condition through dies by the use of hydraulic power. The metal to be extruded is in the form of cylindrical billets which weigh about 75 pounds each and which have a central bore therethrough in which is inserted a mandrel which forms the inner die about which the metal is forced to flow. The preheated mandrel is inserted in the billet which has been previously heated to about 850° F. The mandrel and billet thereon are conveyed as a unit to be loaded in the machine. Upon completing the extrusion operation, the mandrel is unloaded from the machine. Hertofore, the removal of the mandrel required the operator to bend over and reach within the machine in order to disconnect and manually remove a very hot mandrel.

An object of the invention is to provide an apparatus which will be automatically operable to disconnect the mandrel from the machine and convey the mandrel to a location which is more accessible to the operator for handling the same.

Another object of the invention is to provide an apparatus of the above character which will be electrically controlled.

With these and other objects in view, the invention consists of certain novel features of construction as will be more fully described and particularly pointed out in the appended claims.

In the accompanying drawings:

Fig. 1 is an end elevation of the mandrel manipulating apparatus embodying the present invention and shown with surrounding portions of the machine with which it is to be used;

Figure 2 is a top plan view of the apparatus of Fig. 1;

Figure 3 is a sectional view taken substantially along line 3—3 of Figure 2;

Figure 4 is an elevational view of the mandrel gripping jaws of the apparatus looking in the direction of the arrows on line 4—4 of Figure 1;

Figure 5 is a sectional view taken along line 5—5 of Figure 4;

Figure 6 is a sectional view taken along line 6—6 of Figure 3;

Figure 7 is a sectional view similar to the lower portion shown in Figure 3 with the parts shown in a different relation to each other and on an enlarged scale;

Figure 8 is a sectional view taken along line 8—8 of Figure 7;

Figure 9 is a sectional view taken along line 9—9 of Figure 7;

Figure 10 is a perspective view of a lock pin for use in securing the mandrel to the ram of the press; and Figure 11 is a diagram of an electric circuit employed in connection with the operation of the apparatus.

Referring to Figure 1, 10 designates a hydraulically operated machine or press which is adapted for use in extruding aluminum tubing. Only so much of the machine is shown as is believed necessary for an understanding of the present invention, it being understood that parts of the machine which are not shown may be of any usual construction. The machine has a ram 11 (Figure 1) which is operable in a supporting structure indicated generally by numeral 13. The ram 11 has a cylindrical portion 14 (see Figure 7) which is provided with a bore 15 in which there is inserted a rod 16 having a screw threaded end 17. A cylindrical block 18 has a central bore which is reduced inwardly as at 19 dividing the bore into two portions 20 and 21, the latter of which is screw threaded. An opening 22, which is generally rectangular in cross section (see Figure 9), extends from the periphery of the block and intersects the bore portion 20. A groove 23 in the periphery of the block extends at right angles to the axis of bore portion 20 and intersects the outer end portion of the walls of opening 22. A lock pin 24 (see Figure 10) has a shank 25 which is the same in cross section as the cross section of opening 22 and extends into said opening and has an enlarged overhanging head portion 26 which is located in the groove 23 (see Figure 7). The underside 27 of the head 26 extends on an angle to the outer surface of the head and at an angle to the lengthwise surface of the said groove 23, the pin being slidable in said opening 22 and normally projecting into the bore portion 20 as seen in Figure 3. The block 18 is threadedly secured to the rod 16 and abuts against the cylindrical portion 14 to extend in continuation thereof and provides a chuck for receiving and detachably mounting the mandrel M in the ram of the machine.

The mandrel M forms the inner die of the press and has a shank 28, an enlarged head 29 and a mounting trunnion 30 having a reduced neck portion 31 which forms a shoulder 32. The free end portion of trunnion 30 extends on a taper as at 33. The trunnion 30 is slidably received within the bore portion 20 and locked against withdrawal by means of the lock pin engaging behind the shoulder 32 (see Figure 3). In inserting the mandrel into bore 20, the tapered end 33 engages the tapered end 25' of pin 24 and moves the pin 24 outwardly of the bore portion 20 as it passes thereby. Upon the shoulder 33 passing the opening 22, the pin 24 moves inwardly by gravity so that it will be engaged by shoulder 32 if withdrawal of the mandrel should occure.

It will be apparent from the above that the trunnion 30, of a loaded mandrel held in line with the ram of the machine, will enter the chuck of the ram upon movement of said ram in the power applying direction thereof and be moved forward, toward the portion of the machine (not shown) carrying the die through which the metal of the billet carried by the mandrel is forced to form a tube, the shank of the mandrel forming the inner die. Upon the extruding operation having been completed, the tube formed is severed in a known manner from the remaining portion of the billet and the ram is withdrawn to initial location carrying the mandrel which may now be removed to permit loading of the machine with another mandrel and billet to repeat the operation.

In accordance with the present embodiment of the invention, an apparatus designated generally 35 is provided to remove and convey the mandrel to a location readily accessible to the operator. The apparatus 35 (see Figure 2) comprises an open frame having opposite side members 36, 36' which are joined to each other by spaced cross members 37, the ends of which are welded to said side members. The side members 36, 36' extend in parallel relation to each other and are secured at their ends to channel members 38 which are secured and supported on some convenient supporting structure of the machine as at 39 (see Figure 1) at a location to extend above the loading area of the machine. Each side member 36, 36' has a bearing 40 (see Figure 2) secured thereto at the midportion thereof and in which a shaft 41 is journalled both for rotation about the axis thereof and for axial movement. A carriage 42 (see Figure 3) having depending side arms 43 and 44 joined together by bracket 45 is swingably mounted on the shaft 41 and is prevented from axial movement along the shaft by reason of being of a size to extend between bearings 40 in juxtaposition therewith. A counterweight 45' is secured to the carriage 42 to balance the weight of the arms 43, 44.

The side arms 43, 44 may conveniently be made channel shaped in cross section with the open side of the channels facing inwardly toward each other with the side portions of one of said members extending opposite to and in line with the side portions of the other of said member. A cross member 46 (see Figure 6) has one end portion secured to the lower portion of member 43 at one side portion thereof and extends generally horizontally therefrom towards the member 44 to which it is secured. A similar member 47 is similarly positioned and secured at the opposite sides of said members 43, 44 so as to form a pair of oppositely disposed parallel extending guide tracks 48, 49 for a purpose which will hereinafter appear.

The member 44 (see Figures 3 and 8) is much longer than member 43 and carries at the lower end thereof a latch 50 which has a foot portion 51 the upper side of which is inclined to the horizontal when the arm 44 is vertical at an angle similar to the angle of side 27 of pin 24. The foot portion 51 is of a width to be freely moved into and out of groove 23 and is located to register therewith. Thus, as the carriage 42 is swung from the normal position thereof indicated in broken lines 42' (Figure 1) toward the ram 11, the foot portion 51 will move into groove 23 and beneath the head 26 of pin 24. Further movement in the same direction will cause the side 27 of the pin to ride along the incline 52 to be withdrawn thereby outwardly of the bore 20 so as to free the mandrel M and permit the withdrawal thereof from the block or chuck 18. The swinging motion of the carriage 42 on shaft 41 is limited so that the lock pin 24 is moved outwardly a distance only sufficient to free the bore portion 20 of said lock pin.

On shaft 41 of the carriage 42 is an open frame structure designated generally 57 (Figure 3) which comprises a cylindrical block 58 having a central bore 59 and a pair of depending arms 60 which converge toward their lower end and are connected to each other by a plate 61 and carry a pair of mandrel gripping jaws 55 and 56. The jaw 55 is secured to the plate 61. The jaw 56 is pivotally mounted on the jaw 55 as at 62 for movement toward and from jaw 55. To this end, an air motor or cylinder 63 (see Figure 3) is secured to the arms 60 and the piston rod 64 thereof is extended as by means of a link 65 to be pivotally attached to said jaw 56 as at 66 (see Figure 5). Thus as the air cylinder is actuated the jaw 56 may be moved toward or from jaw 55 depending upon the direction of movement of the piston rod 64.

The frame 57 which is of a dimension less than the corresponding dimension between the arms 43 and 44 is mounted on shaft 41 in the space therebetween and secured thereto to move therewith. The arms 60 extend in the space between cross members 46, 47 and each has secured thereto rollers 67 (see Figure 6) which are positioned to engage said cross members 46 and 47. As previously described, the shaft 41 is movable axially and to this end an air cylinder 68 (see Figures 2 and 3) is mounted on the side member 36' and its connecting rod (not shown) is connected in known manner to the shaft 41. Thus as the air cylinder is actuated, the shaft 41 will be moved axially and the frame 57 will likewise move therewith and be guided in the space between members 46, 47 by said rollers 67.

The carriage 42 is swung about the axis of shaft 41 by means of an air cylinder 69 (see Figures 1 and 2) which is pivotally attached as at 70 to a pair of bearing blocks 71 secured to the cross tie indicated 37'. The connecting rod 72 is pivotally connected as at 73 to a clevis 74 secured to the cross member 46. Thus as the air cylinder 69 is operated, the carriage 42 will be rocked or swung about the axis of shaft 41 and the frame portion 57 will move therewith as a unit.

Air under pressure is supplied to air cylinder 69 through solenoid operated valve 80, to air cylinder 63 through solenoid operated valve 81 and to air cylinder 68 through solenoid operated valve 82. The connections between such valves and cylinders are made in the known manner, and these connections are indicated in Figure 2 by broken lines. The solenoid valves are placed in an electric circuit illustrated in Figure 11 and controlled by electric switches LS1, LS2, LS3, LS4, LS5 which are positioned at locations to be engaged and tripped by some traveling parts of the machine. The order of tripping of said switches will be described in connection with the description of the apparatus which now follows.

Referring to Figure 1, the carriage 42 is normally held at the rest position thereof as indicated in broken lines 42' and with the jaws 55 and 56 in the open relation thereof. Switch LS1 has two sets of contacts, LS1A and LS1B. The cycle is described as starting upon the advance of the ram 11 to perform an extruding operation. A bracket such as 11A that moves as the ram 11 advances actuates switch LS1 causing contacts LS1A to close, and contacts LS1B to open, thereby energizing relay A and closing contacts A1, B1. Upon the return of the ram 11 to rest position, switch LS1 is actuated causing contacts LS1A to open and contacts LS1B to close, relay A remaining energized through closed contacts A1, B1. When this occurs, spring return solenoid valve 80 is energized to supply air under pressure to air cylinder 69, valve 80 being a 4-way valve of known construction. The air cylinder 69 will now swing carriage 42 forward towards mandrel M held by the ram 11 or to the left as seen in Figure 1. Upon sufficient movement of carriage 42 in such direction, the foot 51 of latch 50 will move within groove 23 and beneath the head 26 of lock pin 24 to engage inclined side 27 thereof and raise the lock pin 24 to free the mandrel M thereof (see Figure 8). Near the end of the forward stroke of the carriage, the open jaws 55, 56 will be in position to close about the shank 28 of the mandrel. Also, near the end of the forward stroke of the carriage, normally open switch LS2 is actuated closing its contacts, thereby energizing spring return solenoid valve 81, which is a three-way valve of known construction. The energizing of solenoid valve 81 will furnish air under pressure to spring return air cylinder 63 to actuate the same so as to move the jaws in gripping relation upon the shank 28 of the mandrel. The forward movement of the carriage an instant later also trips the normally open switch LS3 which causes the solenoid spring return valve 82 to be energized in a direction to operate the valve 82 to furnish air under pressure to air cylinder 68 to shift shaft 41 to the right from the full line position as seen in Figure 3 to the broken line position indicated 41'. Shifting shaft 41 will move frame 57 likewise to the right as seen in Figure 3 and withdraw the mandrel held in the jaws thereof from the ram 11. During the movement of frame 57 to the right, an arm 58' (Figure 2) carried by block 58 engages and trips normally open switch LS5 which closes the circuit through normally closed switch LS4 to relay B to cause the same to be energized. The energizing of relay B closes contacts B2, B3 and opens contact B1. Opening contact B1 de-energizes relay A, opens contacts A2 to de-energize solenoid valve 80 which operates to furnish air under pressure to the return side of the air cylinder 69. Operation of air cylinder 69 in this direction swings the carriage 42 to return the same to the rest position previously described, the mandrel M being held between the jaws 55 and 56. As the carriage 42 moves to rest position, switches LS3 and LS2 move to open position. The opening of LS3 opens the circuit to solenoid operated valve 82, de-energizing it, which allows air under pressure to flow to the return side of air cylinder 68 thereby moving shaft 41 and the frame 57 to the left to the full line position as shown in Figure 3. When frame 57 returns to rest position, switch LS4 is opened by actuator 42A which de-energizes relay B, closing contact B1 and opening contacts B2 and B3. This action releases solenoid 81 and allows air to escape from air cylinder 63 to permit jaws 55, 56 to move to open position and release mandrel M therefrom which upon release may be manually transferred and be again loaded with a billet to be extruded, thus completing a cycle of operation of the apparatus. Alternately, switch LS4 may be replaced with a manually operated switch so that the mandrel may be released at the operator's convenience.

I claim:

1. In combination with a metal extruding machine having a power applying ram provided at the leading end thereof with a chuck for receiving a mandrel and locking means on said chuck for detachably holding said mandrel in said chuck that improvement that comprises a carriage rockably mounted about an axis spaced from the axis of the mandrel and located above the path of movement of said ram, said carriage having a first part engaging and releasing said locking means to free said mandrel from the chuck, and a second part associated with said carriage for swinging into engagement with and gripping said mandrel and means to move the second part axially with the mandrel to remove the mandrel from said chuck and means to swing the mandrel to one side of the path of movement of said ram upon said mandrel being free of said chuck.

2. In combination as in claim 1 wherein said second part comprises a pair of jaws, and power means to actuate the same.

3. In combination as in claim 1 wherein said first and second parts are actuated together by a power means and upon withdrawal of said locking means automatically cause axial movement of said mandrel and additional means cause movement of the second part to cause movement of the mandrel to one side of the path of movement of said ram.

4. In combination with a metal extruding machine having a power applying ram provided at the leading end thereof with a chuck for receiving a mandrel and locking means on said chuck for detachably holding said mandrel in said chuck, that improvement that comprises an arm swingable about an axis spaced from the axis of said mandrel and of a length to move into engagement with said locking means to free the mandrel therefrom upon return of said ram to the loading position thereof.

5. In combination with a metal extruding machine having a power applying ram provided at the leading end thereof with a chuck for receiving a mandrel and locking means on said chuck for detachably holding said mandrel in said chuck, that improvement that comprises an arm swingable about an axis spaced from the axis of said mandrel and of a length to move into engagement with said locking means to free the mandrel therefrom upon return of said ram to the loading position thereof, and a second arm swingable about an axis spaced from the axis of the mandrel in position to grip said mandrel.

6. In combination with a metal extruding machine having a power applying ram provided at the leading end thereof with a chuck for receiving a mandrel and locking means on said chuck for detachably holding said mandrel in said chuck, that improvement that comprises an arm swingable, about an axis spaced from the axis of said mandrel and of a length to move into engagement with said locking means to free the mandrel therefrom upon return of said ram to the loading position thereof, and a second arm swingable into a vertical position to engage the mandrel and lift the mandrel by swinging from said vertical position after withdrawal of the mandrel from said chuck.

7. In combination with a metal extruding machine having a power applying ram provided at the leading end thereof with a chuck for receiving a mandrel and locking means on said chuck for detachably holding said mandrel in said chuck, that improvement that comprises an arm swingable about an axis spaced from the axis of said mandrel and of a length to move into engagement with said locking means to free the mandrel therefrom upon return of said ram to the loading position thereof, and a second arm swingable about an axis spaced from the axis of the mandrel and having a pair of jaws to close on and grip said mandrel, and means to move the second arm to pull the mandrel axially from said chuck.

8. In combination with a metal extruding machine having a power applying ram provided at the leading end thereof with a chuck for receiving a mandrel and locking means on said chuck for detachably holding said mandrel in said chuck, that improvement that comprises an arm swingable about an axis spaced from the axis of said mandrel and of a length to move into engagement with said locking means to free the mandrel therefrom upon return of said ram to the loading position thereof, and a second arm swingable about an axis spaced from the axis of the mandrel and having a pair of jaws to close on and grip said mandrel and means acting along the pivotal axis of the second arm for moving the second arm to pull the mandrel axially from said chuck.

9. In combination with a metal extruding machine having a power applying ram provided at the leading end thereof with a chuck for receiving a mandrel and locking means on said chuck for detachably holding said mandrel in said chuck that improvement that comprises a carriage rockably mounted about an axis spaced from the axis of the mandrel and located above the path of movement of said ram, said carriage having a first part engaging and releasing said locking means to free said mandrel from the chuck, and a second part associated with said carriage having a pair of jaws to close on and grip said mandrel and fluid means to move the carriage to pull the mandrel axially from said chuck.

10. In combination with a metal extruding machine having a power applying ram provided at the leading end thereof with a chuck for receiving a mandrel and locking means on said chuck for detachably holding said mandrel in said chuck that improvement that comprises a carriage rockably mounted about an axis spaced from the axis of the mandrel and located above the path of movement of said ram, said carriage having a first part engaging and releasing said locking means to free said mandrel from the chuck, and a second part associated with said carriage having a pair of jaws to close on and grip said mandrel and fluid means acting along the pivotal axis of the carriage for moving the carriage to pull the mandrel axially from said chuck.

References Cited in the file of this patent

UNITED STATES PATENTS

| | | |
|---|---|---|
| 658,882 | Thust | Oct. 2, 1900 |
| 1,330,489 | Neuberth | Feb. 10, 1920 |
| 1,859,990 | Schlenstedt | Mar. 24, 1932 |
| 1,933,225 | Smith | Oct. 31, 1933 |
| 2,672,234 | Lorant | Mar. 16, 1954 |